(12) United States Patent
Price et al.

(10) Patent No.: US 11,508,355 B1
(45) Date of Patent: Nov. 22, 2022

(54) EXTRACTING NATURAL LANGUAGE SEMANTICS FROM SPEECH WITHOUT THE USE OF SPEECH RECOGNITION

(71) Applicant: Interactions LLC, Franklin, MA (US)

(72) Inventors: Ryan Price, New Providence, NJ (US); Srinivas Bangalore, Morristown, NJ (US)

(73) Assignee: Interactions LLC, Franklin, MA (US)

( * ) Notice: Subject to any disclaimer, the term of this patent is extended or adjusted under 35 U.S.C. 154(b) by 153 days.

(21) Appl. No.: 16/172,115

(22) Filed: Oct. 26, 2018

Related U.S. Application Data

(60) Provisional application No. 62/578,221, filed on Oct. 27, 2017.

(51) Int. Cl.
| | | |
|---|---|---|
| *G10L 15/06* | (2013.01) | |
| *G10L 15/22* | (2006.01) | |
| *G10L 15/02* | (2006.01) | |
| *G10L 21/0232* | (2013.01) | |
| *G10L 15/18* | (2013.01) | |

(52) U.S. Cl.
CPC ............ *G10L 15/063* (2013.01); *G10L 15/02* (2013.01); *G10L 15/1815* (2013.01); *G10L 15/22* (2013.01); *G10L 21/0232* (2013.01); *G10L 2015/025* (2013.01)

(58) Field of Classification Search
CPC ..... G10L 15/16; G10L 15/063; G10L 15/187; G10L 15/02; G10L 15/197; G10L 15/26; G10L 15/183; G10L 2015/025; G10L 15/14
See application file for complete search history.

(56) References Cited

U.S. PATENT DOCUMENTS

| | | | | |
|---|---|---|---|---|
| 9,786,270 | B2* | 10/2017 | Senior | ................. G10L 15/063 |
| 10,134,388 | B1* | 11/2018 | Lilly | .................... G06F 40/268 |
| 10,229,672 | B1* | 3/2019 | Rao | ......................... G10L 15/16 |
| 10,255,905 | B2* | 4/2019 | Chua | ...................... G10L 13/10 |

(Continued)

OTHER PUBLICATIONS

Amodei, D. et al. "Deep speech 2: End-to-end speech recognition in English and Mandarin," International Conference on Machine Learning, 2016, pp. 173-182.

(Continued)

*Primary Examiner* — Mark Villena
(74) *Attorney, Agent, or Firm* — Fenwick & West LLP

(57) ABSTRACT

Systems and methods are disclosed herein for discerning aspects of user speech to determine user intent and/or other acoustic features of a sound input without the use of an ASR engine. To this end, a processor may receive a sound signal comprising raw acoustic data from a client device, and divides the data into acoustic units. The processor feeds the acoustic units through a first machine learning model to obtain a first output and determines a first mapping, using the first output, of each respective acoustic unit to a plurality of candidate representations of the respective acoustic unit. The processor feeds each candidate representation of the plurality through a second machine learning model to obtain a second output, determines a second mapping, using the second output, of each candidate representation to a known condition, and determines a label for the sound signal based on the second mapping.

16 Claims, 3 Drawing Sheets

(56) References Cited

U.S. PATENT DOCUMENTS

| | | | | |
|---|---|---|---|---|
| 2008/0082336 | A1* | 4/2008 | Duke | G10L 15/26 704/254 |
| 2012/0116772 | A1* | 5/2012 | Jones | G16H 40/67 704/270 |
| 2014/0278412 | A1* | 9/2014 | Scheffer | G10L 25/03 704/240 |
| 2015/0340034 | A1* | 11/2015 | Schalkwyk | G10L 15/18 704/235 |
| 2016/0140956 | A1* | 5/2016 | Yu | G10L 15/08 704/240 |
| 2016/0351188 | A1* | 12/2016 | Rao | G06N 3/084 |
| 2017/0011738 | A1* | 1/2017 | Senior | G10L 15/063 |
| 2018/0053500 | A1* | 2/2018 | Sak | G10L 15/02 |
| 2018/0061439 | A1* | 3/2018 | Diamos | G10L 15/063 |
| 2018/0082679 | A1* | 3/2018 | McCord | G10L 13/033 |

OTHER PUBLICATIONS

Audhkhasi, K. et al. "End-to-end asr-free keyword search from speech," arXiv preprint arXiv:1701.04313, 2017.

Bahndanau, D. et al. "End-to-end attention-based large vocabulary speech recognition," IEEE International Conference on Acoustics, Speech and Signal Processing (ICASSP), 2016, pp. 4945-4949.

Deng, L et al. "Use of kernel deep convex networks and end-to-end learning for spoken language understanding," Spoken Language Technology Workshop (SLT), IEEE, 2012, pp. 210-215.

Graves, A. et al. "Connectionist temporal classification: labelling unsegmented sequence data with recurrent neural networks," Proceedings of the 23rd international conference on Machine learning, ACM, 2006, pp. 369-376.

Graves, A. et al. "Speech recognition with deep recurrent neural networks," IEEE International Conference on Acoustics, Speech and Signal Processing (ICASSP), 2013, pp. 6645-6649.

Graves, A. et al. "Towards end-to-end speech recognition with recurrent neural networks," Proceedings of the 31st International Conference on Machine Learning (JCML-14), 2014, pp. 1764-1772.

Haffner, P. et al. "Optimizing svms for complex call classification," IEEE International Conference on Acoustics, Speech, and Signal Processing, 2003, vol. 1, 4 pages.

He, X. et al. "Speech-centric information processing: An optimization-oriented approach," Proceedings of the IEEE, 2013, vol. 101, No. 5, pp. 1116-1135.

He, X. et al. "Why word error rate is not a good metric for speech recognizer training for the speech translation task?" IEEE International Conference on Acoustics, Speech and Signal Processing (ICASSP), 2011, pp. 5632-5635.

Ioffe, S. et al. "Batch normalization: Accelerating deep network training by reducing internal covariate shift," International Conference on Machine Learning, 2015, pp. 448-456.

Kanthak, S. et al. "Context-dependent acoustic modeling using graphemes for large vocabulary speech recognition," IEEE International Conference on Acoustics, Speech, and Signal Processing (JCASSP), 2002, vol. 1, pp. 1-845.

Khurana, S. et al. "Qcri advanced transcription system (qats) for the arabic multi-dialect broadcast media recognition: Mgb-2 challenge," IEEE Spoken Language Technology Workshop (SLT), 2016, pp. 292-298.

Killer, M. et al. "Grapheme based speech recognition," INTERSPEECH, 2003, 119 pages.

Kim, S. et al. "Joint ctc-attention based end-to-end speech recognition using multi-task learning," IEEE International Conference on Acoustics, Speech and Signal Processing (JCASSP), 2017, pp. 4835-4839.

Laurent, C. et al. "Batch normalized recurrent neural networks," IEEE International Conference on Acoustics, Speech and Signal Processing (ICASSP), 2016, pp. 2657-2661.

Lee, L. et al. "Spoken content retrieval beyond cascading speech recognition with text retrieval," IEEE/ACM Transactions on Audio, Speech, and Language Processing, 2015, vol. 23, No. 9, pp. 1389-1420.

Liu, C. et al. "Topic identification for speech without asr," arXiv preprintarXiv:1703.07476, 2017.

Liu, H. et al. "Gram-ctc: Automatic unit selection and target decomposition for sequence labelling," arXiv preprint arXiv:1703.00096, 2017, 10 pages.

Maas, A. et al. "Lexicon-free conversational speech recognition with neural networks," Proceedings of the 2015 Conference of the North American Chapter of the Association for Computational Linguistics: Human Language Technologies, 2015, pp. 345-354.

Mesnil, G. et al. "Using recurrent neural networks for slot filling in spoken language understanding," IEEE/ACM Transactions on Audio, Speech and Language Processing (TASLP), 2015, vol. 23, No. 3, pp. 530-539.

Miao, Y. et al. "Eesen: End-to-end speech recognition using deep rnn models and wfst-based decoding," IEEE Workshop on Automatic Speech Recognition and Understanding (ASRU), 2015, pp. 167-174.

Miao, Y. et al. "An empirical exploration of ctc acoustic models," IEEE International Conference on Acoustics, Speech and Signal Processing (ICASSP), 2016, pp. 2623-2627.

Mohri, M. et al. "Weighted finite-state transducers in speech recognition," Computer Speech & Language, 2002, vol. 16, No. 1, pp. 69-88.

Naren, S. "deepspeech.pytorch" 2017, 6 pages, [Online] [Retrieved Nov. 6, 2018], Retrieved from the internet <URL:https://github.com/SeanNaren/deepspeech.pytorch>.

Povey, D. et al. "The kaldi speech recognition toolkit," IEEE Workshop on Automatic Speech Recognition and Understanding, 2011, 4 pages.

Rao, K. et al. "Flat start training of cd-ctc-smbr lstm rnn acoustic models," IEEE International Conference on Acoustics, Speech and Signal Processing (ICASSP), 2016, pp. 5405-5409.

Sainath, T et al. "Convolutional neural networks for small-footprint keyword spotting," INTERSPEECH, 2015, pp. 1478-1482.

Sak, H. et al. "Fast and accurate recurrent neural network acoustic models for speech recognition," arXiv preprint arXiv: 1507.06947, 2015, 5 pages.

Senior, A. et al. "Acoustic modelling with cd-ctc-smbr lstm rnns," IEEE Workshop on Automatic Speech Recognition and Understanding (ASRU), 2015, 6 pages.

Tur, G. et al. "Improving Spoken Language Understanding Using Word Confusion Networks," Proceedings of ICSLP'02, Sep. 2002, pp. 1137-1140.

Tur, G. et al. "Towards deeper understanding: Deep convex networks for semantic utterance classification," IEEE International Conference on Acoustics, Speech and Signal Processing (ICASSP), 2012, pp. 5045-5048.

Vu, N.C. et al. "Bi-directional recurrent neural network with ranking loss for spoken language understanding," IEEE International Conference on Acoustics, Speech and Signal Processing (ICASSP), 2016, pp. 6060-6064.

Vu, N.C. et al. "Sequential convolutional neural networks for slot filling in spoken language understanding," arXiv preprint arXiv:1606.0778, 2016.

Yaman, S. et al. "An integrative and discriminative technique for spoken utterance classification," IEEE Transactions on Audio, Speech, and Language Processing, 2008, vol. 16, No. 6, pp. 1207-1214.

Yao, K. et al. "Spoken language understanding using long short-term memory neural networks," IEEE Spoken Language Technology Workshop (SLT), 2014, pp. 189-194.

Young, S. et al. "Tree-based state tying for high accuracy acoustic modelling," Proceedings of the workshop on Human Language Technology. Association for Computational Linguistics, 1994, pp. 307-312.

Zhang, X. et al. "Character-level convolutional networks for text classification," Advances in Neural Information Processing Systems, 2015, pp. 649-657.

Zweig, G. et al. "Advances in all-neural speech recognition," IEEE International Conference on Acoustics, Speech and Signal Processing (JCASSP), 2017, pp. 4805-4809.

* cited by examiner

EXTRACTING NATURAL LANGUAGE SEMANTICS FROM SPEECH WITHOUT THE USE OF SPEECH RECOGNITION

FIELD OF ART

The present invention generally relates to electronic natural language processing, and more specifically to training and/or using models to extract semantics from user speech without the use of speech recognition.

BACKGROUND

In a speech-driven human-computer conversation system, the problem of understanding a user's speech input requires mapping the speech input into semantic properties (e.g., intent) that may be used to respond to the speech. A conventional approach to determine the semantics of user speech input is to first perform speech-to-text (known as automatic speech recognition (ASR)) to convert the user speech input to a sequence of words and then to translate the sequence of words into semantics. A shortcoming of such an approach is that in order to build conversational systems rapidly in multiple languages, an ASR system is required for each of these languages. Building such a system requires generating a pronunciation lexicon in every language, and potentially in multiple dialects and accents, which is a tedious and expensive process that requires manual supervision.

SUMMARY

Systems and methods are disclosed herein for discerning aspects of user speech to determine user intent and/or other acoustic features of a sound input without the use of an ASR engine. For example, the systems and methods described herein include deconstructing a sound signal into small acoustic units (e.g., graphemes), and feeding those acoustic units into a machine learning model, in order to determine aspects of the sound signal, such as an intent of the user who generated the sound signal, or noise and/or other characteristics of the sound signal. By performing this task at the level of using raw sound data and small acoustic units (e.g., sounds that produce less than a full word), the use of a pronunciation lexicon is not needed to discern the user's words, and thus the challenges imposed by conventional ASR systems are overcome.

To this end and others, in some aspects of the disclosure, a processor (e.g., of a server provided by an intent-detection service) receives a sound signal comprising raw acoustic data from a client device. For example, the processor may receive voice input, as detected by a microphone sensor at the client device and relayed to the server over a network. The processor may divide the raw acoustic data into a plurality of acoustic units (e.g., into individual graphemes or phonemes).

The processor feeds the plurality of acoustic units through a first machine learning model to obtain a first output, and determines a first mapping, using the first output, of each respective acoustic unit of the plurality of acoustic units to a plurality (e.g., vector) of candidate representations of the respective acoustic unit. In some embodiments, each candidate representation of the plurality of candidate representations is composed of a respective plurality of probabilities that the respective acoustic unit corresponds to a sound property (e.g., a given word, background noise, etc.). Moreover, in some embodiments, feeding the plurality of acoustic units through the first machine learning model to obtain the first output includes pre-training an acoustic model using a connectionist temporal classification, where the acoustic model is a grapheme-based network, and where the first machine learning model uses the acoustic model to obtain the first output. The processor may pre-train the acoustic model by determining, using the connectionist temporal classification, an alignment of the raw acoustic data without use of an automated speech recognition model. In other embodiments, the first machine learning model is not pre-trained, but rather is trained from a random initialization.

In some embodiments, the processor feeds each candidate representation of the plurality of candidate representations through a second machine learning model to obtain a second output, and goes on to determine a second mapping, using the second output, of each candidate representation of the plurality of candidate representations to a known condition (e.g., a given vocalization, background noise, etc.). Alternatively, the processor may determine the second mapping using a single machine learning model using the second output. In either embodiment, the processor determines a label for the sound signal based on the second mapping (e.g., affirmatively labels the sound signal as spoken sound, or as containing a given word, or as background noise, etc.). In some embodiments, the processor may jointly optimize the first mapping and the second mapping by pre-training the first machine learning model, determining that the pre-training of the first machine learning model is complete, and, in response to determining that the pre-training of the first machine learning model is complete, updating the first mapping and the second mapping.

In embodiments where the sound signal comprises speech spoken by a user of the client device, the processor divides the raw acoustic data into the plurality of acoustic units by dividing the raw acoustic data into a plurality of graphemes. The processor then determines the label for the sound signal based on the second mapping by determining a semantic property of the sound signal using the second mapping, and selecting a candidate label from a plurality of candidate labels, where the selected candidate label corresponds to the semantic property of the sound signal. For example, if the sound signal is a statement of "I am having problems with my telephone service", the semantic properties of "problem" and "telephone service" may be detected, and a label of "route to technical support" may be selected.

The sound signal may include noise other than the speech spoken by the user. For example, the sound signal may include background traffic noise that is detectable by a microphone of a client device through which the user is speaking. In such embodiments, the processor may, when determining the second mapping, map the noise to a known type of noise, and may determine an additional label for the sound signal, the additional label corresponding to a source of the known type of noise.

As mentioned above, the first mapping and the second mapping are determined without use of an automated speech recognition model that produces word transcriptions of speech signal data. Further, when the sound signal is speech data, the processor may assign a label to a semantic property of the speech data using any or all of candidate labels that correspond to language, age, gender, emotion, opinion, intent, and speech act.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
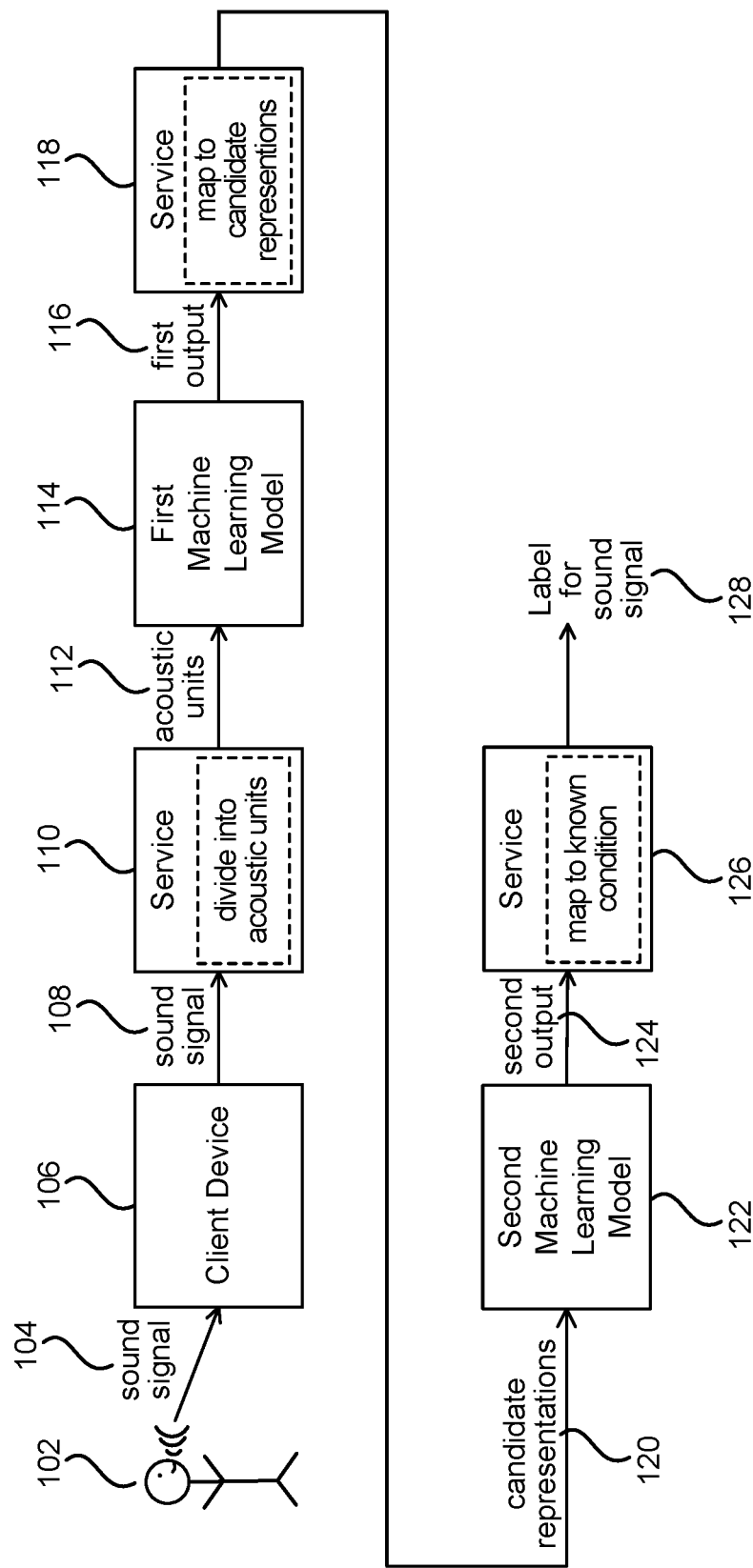
FIG. 1 illustrates data flow diagram illustrating a process in which speech recognition takes place without use of an ASR engine, according to an embodiment.

FIG. 1 is a data flow diagram illustrating a process in which speech recognition takes place without use of an ASR engine, according to an embodiment. The data flow begins with a source emitting 102 a sound signal, which travels 104 and is detected 106 by a client device. While the source is depicted as a person, the source can be any source of sound, such as an audio output device (e.g., a speaker device), an ambient source of sound (e.g., traffic noise or crowd noise), or any actor, whether human-driven or natural (e.g., animal noises, wind rustling leaves, etc.) that generates sound. The client device may be any device used by a user, such as a smartphone device, a tablet computer, a laptop computer, and the like. Details about client devices are discussed in further detail below with respect to FIG. 3.

The client device transmits 108 the sound signal to a service, which receives the sound signal. The service is used to process the sound signal to ultimately apply one or more labels to the sound signal based on one or more acoustic properties of the sound signal, the detailed processing being described below with respect to the remainder of FIG. 1. For example, the service may determine whether a sound signal has a particular semantic property, whether the sound signal corresponds to a particular user intent, whether the sound signal includes certain types of background noise, or corresponds to a particular type of sound (e.g., a lecture, or a song), and the like, and then applies one or more labels accordingly. Further details of how the service may be implemented (e.g., in software and/or hardware) are described below with reference to FIGS. 2 and 3.

In order to apply one or more labels to the sound signal, the service first divides 110 the sound signal into acoustic units. As used herein, acoustic units (also referred to as raw acoustic units) are derived from a raw sound signal by a processor of the service dividing a sound signal into two or more units of acoustic data. The acoustic data of the acoustic units remains raw sound data, and is not converted in any manner beyond being divided from other acoustic data of the sound signal from which it is derived. For example, the acoustic data does not represent a word of a string of words; rather, it remains a portion of, or the entirety of, the actual sound detected by the client device when a portion of the word, the full word, or the string of words, was spoken. Each acoustic unit may be a grapheme, which as used herein is a smallest meaningful contrastive unit of sound from which intent or other meaningful characteristics can be derived.

The processor of the service feeds 112 the acoustic units, derived from the sound signal, through a first machine learning model, which processes 114 each acoustic unit, and from which the service derives 116 a first output. In an embodiment, the first machine learning model is a grapheme-based network with convolutional and recurrent layers, and is (or uses) an acoustic model pre-trained by the service using a Connectionist Temporal Classification (CTC). CTC is a sequence based objective for recurrent neural networks (RNNs) that does not require a predetermined alignment of input frames to output labels for training. An alignment between inputs and output label sequences is learned during the pre-training of the first machine learning model, obviating the need for a frame-level alignment generated by conventional ASR systems for training, for reasons to be explained below.

The assumptions used in the design of acoustic models in conventional ASR systems are such that these acoustic models must be trained to predict a state associated with a sub-word sound units (e.g. graphemes) for each input frame, meaning a training label is needed for each input frame. For example, an utterance for training such an acoustic model may be the word "hello," which was recorded over a one-second long sound clip including 100 frames of acoustic features. In this example there are 5 graphemes in 'hello' but we have 100 input frames so a method is needed to determine an alignment between the 5 graphemes and the 100 frames in order to obtain a training label for each frame. In some embodiments, to determine when the 'h' sound starts and how many frames it lasts for, a processor divides the alignment evenly, training the acoustic model to predict labels for 'h' for the first 20 input frames, 'e' for the next 20, etc. In other embodiments, the processor may alternatively take a pre-existing, well-trained acoustic model and allow it to find the best matching alignment by assigning probabilities to different candidate alignments. However, in a preferred embodiment of the disclosure where a CTC-trained acoustic model (or similar), this alignment is not needed. This is because CTC makes the process of finding the best matching alignment part of the learning process, built into the algorithm, whereas embodiments using a conventional acoustic model are trained to predict a single label at a time—which is why a label is needed for every frame. CTC, RNN transducers, sequence-to-sequence models, etc. operate on an entire sequence, each algorithm in its own way but without the need for per-frame labels from an existing system.

Following the example above, given the 5 graphemes making up 'hello' and the 100 acoustic frames in the recording, CTC actually considers all the possible ways of aligning those 100 frames to the 5 graphemes during training, weighing each possible way of alignment ("CTC Path") according to how probable it is, so, advantageously, a hard decision of which frame corresponds to which grapheme from a pre-existing system is not required. A CTC Path is a valid alignment between input frames and output labels that produces the correct word sequence which was spoken in the training utterance, and many possible CTC paths may exist for a given sound signal. For example, in a training example where the word "cat" was spoken in five frames of acoustic input, any manner of putting the letters "c" "a" and "t" into one of the five frames would be a correct CTC path. Moreover, a repetition of letters, or a blank "no output symbol," may be used in the five frames. Some example valid CTC paths are as follows: {C C A A T}; {_ _C A T}; {C_A T T}; and so on. In some embodiments, a CTC path may be invalid if a letter repeats when separated by a "no output symbol" (e.g., {C_C A T}). In some embodiments, pre-training of the first machine learning model is performed using RNN transducers, or other sequence-to-sequence networks, including attention-based networks.

The service determines 118 a first mapping using the first output. The mapping maps each respective acoustic unit of the plurality of acoustic units to a plurality (e.g., vector) of candidate representations of the respective acoustic unit. For example, the first mapping may map each respective unit to a vector of a plurality of probabilities that the respective acoustic unit corresponds to a sound property, and may thus contain a plurality of probabilities for each respective acoustic unit. The vector may include values between zero and one for each element (e.g., grapheme/phoneme) in the candidate representation, summing to one over the vector. The vector may include probabilities that the sound is not only spoken words, but also probabilities that the sound is silence or unspoken noise. As described below, the service may ultimately apply a label to the sound signal corresponding to, e.g., the grapheme, phoneme, or other acoustic unit having the highest probability. Alternatively, the candidate representation may remain as raw data (e.g., probabilities or other raw output), such as in instances where applying a label is not a requirement of the system, or is determined to not be meaningful (e.g. when all probabilities are roughly equal).

The processor may feed 120 each candidate representation of the plurality of candidate representations (e.g., vector) through a second machine learning model, which processes 122 each candidate representation. The processor of the service may obtain therefrom 124 a second output, and may use the second output to determine 126 a second mapping of each candidate representation of the vector to a known condition. In some embodiments, the processing 122 is a fine-tuning of the candidate representations in order to optimize the candidate representations for the purpose of determining an intent of a given acoustic unit, or of several acoustic units in tandem. This fine-tuning may be done in the same system, and with the same training data used, for the processing 114 using the first machine learning model, thus avoiding a need to train an acoustic model, language model, and natural language unit classifier independently, as is required by conventional ASR systems. For example, in some embodiments, the processor of the service may jointly optimize the first mapping and the second mapping by pre-training the first machine learning model and updating the first mapping and the second mapping with that pre-trained data.

Finally, the processor of the service determines 128 a label for the sound signal based on the second mapping. The processor may determine 128 the label by determining a semantic property of the sound signal using the second mapping, and selecting a label that corresponds to the semantic property of the sound signal. For example, if the sound signal was produced by a user stating that he is having trouble with his phone, the semantic property may be that the user has an intent to receive technical assistance. The processor may assign a label to any semantic property of the speech data using labels corresponding to any or all of language, age, gender, emotion, opinion, intent, speech act, and the like.

The label need not be semantic in nature, or, alternatively, the processor of the service may assign multiple labels to a sound signal (or an acoustic unit thereof). For example, the sound signal may include noise other than the speech spoken by the user, such as background traffic noise that is detectable by a microphone of a client device through which the user is speaking. In such embodiments, the processor may map the noise to a known type of noise (using the second mapping), and may determine an additional label for the sound signal, the additional label corresponding to a source of the known type of noise. Thus, if the user stated that he was having trouble with his phone while walking down a street with a lot of traffic, two labels may be assigned to the signal—a semantic label indicating that the user has an intent to receive technical assistance, and a different label indicating that the user is in an area with traffic noise. If the traffic noise obscured the user's speech, the service might, based on the different label, apply sound correction (e.g., noise canceling) that corresponds to the label, in order to detect and process the user's speech within the sound signal. As another example, the service may determine using the first mapping and the second mapping that the sound signal is not a user's voice, but instead is a lecture or an audio recording or a song, and may apply labels that indicate these properties.

In some embodiments, the system described with reference to FIG. 1 may be implemented to route a user's communication session to an appropriate endpoint. For example, if the service is an automated call router, which routes calls differently based on what a user speaks, the service may route calls based on intent labels assigned to a sound signal. Specifically, while conventional ASR systems require a user to state with specificity menu items corresponding with where their calls would like to be routed, the instant disclosure would enable a call router to function such that the user need not state, verbatim, a menu item, but rather need only express a discernible intent that can be discovered through the system described with respect to FIG. 1. If the service cannot discern the user's intent, then the service may route the user's call to a human assistant.

Figure 2:
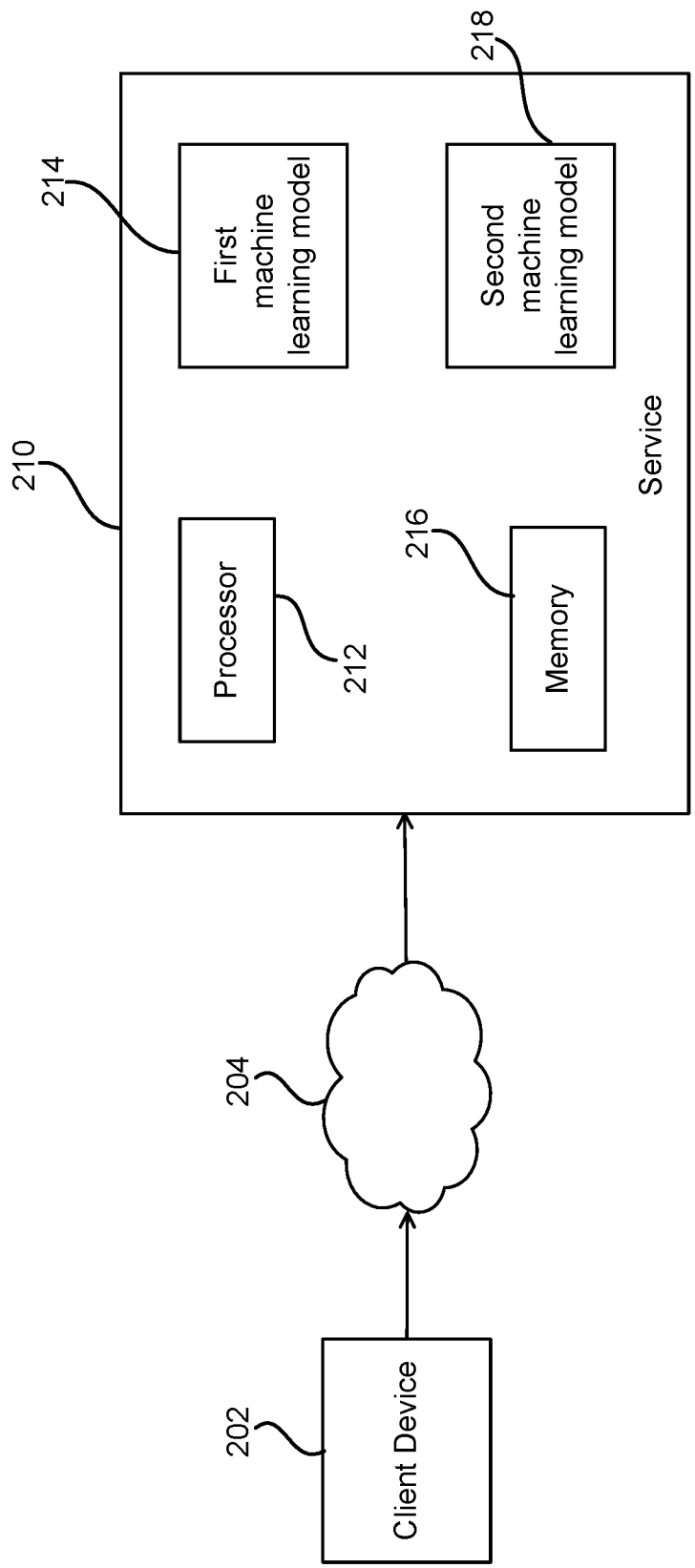
FIG. 2 is a block diagram illustrating the various components of a speech interpretation service, according to an embodiment.

FIG. 2 is a block diagram illustrating the various components of a speech interpretation service, according to an embodiment. In the embodiment illustrated in FIG. 2, client device 202 provides a sound signal over a computer network 204, such as the Internet, to a service 210, which performs the interpretation of the sound signal in the manner discussed above with respect to FIG. 1. As mentioned above, client device 202 is a computing device, such as a smart phone, a laptop computer, a desktop computer, or any other device that can accept a sound signal (e.g., spoken input from a user) and provide the sound signal to the service 210 over the computer network 204.

The computer network 204 may be any suitable communications network for data transmission. In an embodiment such as that illustrated in FIG. 2, the network 202 uses standard communications technologies and/or protocols and can include the Internet. In another embodiment, the entities use custom and/or dedicated data communications technologies.

Service 210 may be implemented across one or more servers, accessible to client device 202 by way of computer network 204. Service 210 includes a processor, whose implementation is described above with respect to FIG. 1, and whose components are described further below with respect to FIG. 3. In brief, processor 212 receives a sound signal from client device 202, and processes that sound signal by feeding it through machine learning models (e.g., first machine learning model 214, and (in some embodiments) second machine learning model 218) to determine a label for the sound signal (or for a part thereof). Processor 212 may access memory 216 to store and/or retrieve data in connection with this process, as described further below with respect to FIG. 3.

It is appreciated that although for the sake of simplicity only one client device 120, and one service 210 are illustrated, there could be any number thereof, and processing may be distributed across those plural client devices and/or services. Additionally, in some embodiments the modules offered by service 210 (e.g., first machine learning model 214 and second machine learning model 218, and the functionality of processor 212) may be implemented partially or entirely on systems other than service 210, such as on the client device 202.

Figure 3:
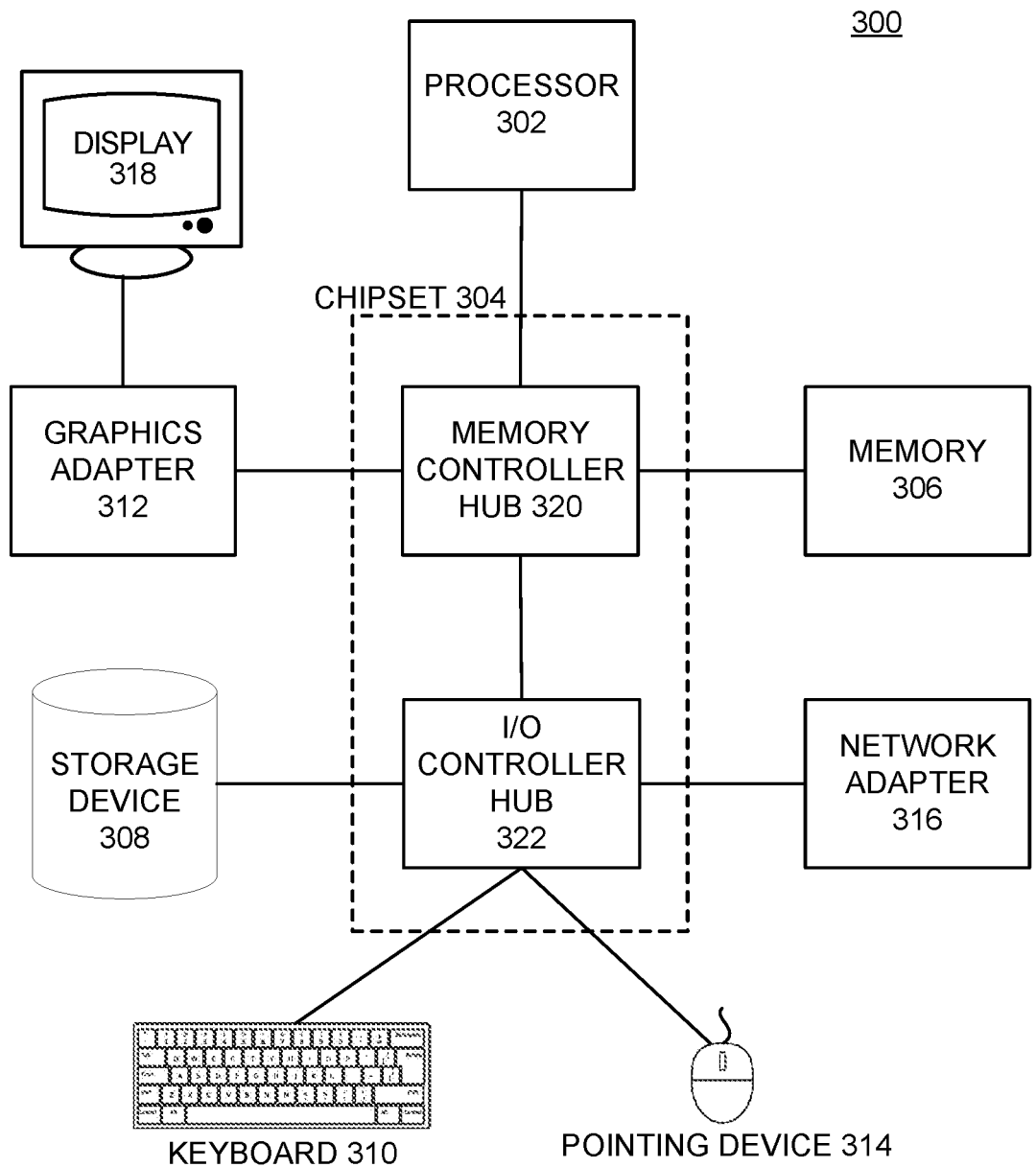
FIG. 3 is a high-level block diagram illustrating physical components of a computer used as part or all of a label assignment service or client device involved in the data flow of FIG. 1, according to an embodiment.

FIG. 3 is a high-level block diagram illustrating physical components of a computer used as part or all of a label assignment service or client device involved in the data flow of FIG. 1, according to an embodiment. Illustrated are at least one processor 302 coupled to a chipset 304. Also coupled to the chipset 304 are a memory 306, a storage device 308, a graphics adapter 312, and a network adapter 316. A display 318 is coupled to the graphics adapter 312. In one embodiment, the functionality of the chipset 304 is provided by a memory controller hub 320 and an I/O controller hub 322 (e.g., controlling a keyboard 310 and/or a pointing device 314). In another embodiment, the memory 306 is coupled directly to the processor 302 instead of the chipset 304.

The storage device 308 is any non-transitory computer-readable storage medium, such as a hard drive, compact disk read-only memory (CD-ROM), DVD, or a solid-state memory device. The memory 306 holds instructions and data used by the processor 302. The graphics adapter 312 displays images and other information on the display 318. The network adapter 316 couples the computer 300 to a local or wide area network.

As is known in the art, a computer 300 can have different and/or other components than those shown in FIG. 3. In addition, the computer 300 can lack certain illustrated components. In one embodiment, a computer 300 acting as a server may lack a graphics adapter 312, and/or display 318, as well as a keyboard or pointing device. Moreover, the storage device 308 can be local and/or remote from the computer 300 (such as embodied within a storage area network (SAN)).

As is known in the art, the computer 300 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 308, loaded into the memory 306, and executed by the processor 302. First machine learning model 214 and second machine learning model 218 are examples of modules.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

OTHER CONSIDERATIONS

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method comprising:
receiving a sound signal comprising raw acoustic data including spoken words from a client device;
dividing the raw acoustic data for the spoken words into a plurality of acoustic units that, when taken together, form the spoken words, and that remain in raw sound format after being divided;
feeding the plurality of acoustic units through a first machine learning model to generate a first mapping of each respective acoustic unit of the plurality of acoustic units to a plurality of candidate representations of the respective acoustic unit, each candidate representation having an associated probability of accurately representing the respective acoustic unit;
feeding each candidate representation of the plurality of candidate representations through a second machine learning model to generate a second mapping of each candidate representation of the plurality of candidate representations to a known condition, each known condition having an associated probability of accurately representing the respective acoustic unit, wherein both the first mapping and the second mapping are generated without use of an automated speech recognition model that produces word transcriptions of speech signal data; and
determining a label for the sound signal based on the probabilities associated with the known conditions.

2. The computer-implemented method of claim 1, wherein the sound signal comprises speech spoken by a user of the client device, wherein dividing the raw acoustic data into the plurality of acoustic units comprises dividing the raw acoustic data into a plurality of graphemes, and wherein determining the label for the sound signal based on the second mapping comprises:
determining a semantic property of the sound signal using the second mapping; and
determining the label by selecting a candidate label from a plurality of candidate labels, the selected candidate label corresponding to the semantic property of the sound signal.

3. The computer-implemented method of claim 2, wherein the sound signal additionally comprises noise other than the speech spoken by the user and wherein the method further comprises processing the sound signal by subtracting the noise from the sound signal using a noise canceling operation.

4. The computer-implemented method of claim 3, wherein determining the second mapping comprises mapping the noise to a known type of noise, and wherein the method further comprises:
determining an additional label for the sound signal, the additional label corresponding to a source of the known type of noise, wherein the subtracting of the noise from the sound signal is performed based on the additional label.

5. The computer-implemented method of claim 1, wherein each candidate label of the plurality of candidate labels corresponds to a semantic property comprising one or more of language, age, gender, emotion, opinion, intent, and speech act.

6. The computer-implemented method of claim 1, wherein feeding the plurality of acoustic units through the first machine learning model to generate the first mapping comprises:
pre-training an acoustic model using a connectionist temporal classification, the acoustic model being a grapheme-based network, the first machine learning model using the acoustic model to generate the first mapping.

7. The computer-implemented method of claim 6, wherein pre-training the acoustic model comprises determining, using the connectionist temporal classification, an alignment of the raw acoustic data without use of an automated speech recognition model.

8. The computer-implemented method of claim 1, further comprising jointly optimizing the first mapping and the second mapping by:
pre-training the first machine learning model;
determining that the pre-training of the first machine learning model is complete; and
in response to determining that the pre-training of the first machine learning model is complete, updating the first mapping and the second mapping.

9. The computer-implemented method of claim 1, wherein the first machine learning model is not pre-trained, and wherein the first machine learning model is trained from a random initialization.

10. A non-transitory computer-readable storage medium storing instructions executable by a computer processor, the instructions comprising:
instructions for receiving a sound signal comprising raw acoustic data including a spoken word from a client device;
instructions for dividing the raw acoustic data for the spoken word into a plurality of acoustic units that, when taken together, form spoken words, and that remain in raw sound format after being divided;
instructions for feeding the plurality of acoustic units through a first machine learning model to generate a first mapping of each respective acoustic unit of the plurality of acoustic units to a plurality of candidate representations of the respective acoustic unit, each candidate representation having an associated probability of accurately representing the respective acoustic unit;
instructions for feeding each candidate representation of the plurality of candidate representations through a second machine learning model to generate a second mapping of each candidate representation of the plurality of candidate representations to a known condition, each known condition having an associated probability of accurately representing the respective acoustic unit, wherein both the first mapping and the second mapping are generated without use of an automated speech recognition model that produces word transcriptions of speech signal data; and
instructions for determining a label for the sound signal based on the probabilities associated with the known conditions.

11. The non-transitory computer-readable medium of claim 10, wherein the sound signal comprises speech spoken by a user of the client device, wherein the instructions for dividing the raw acoustic data into the plurality of acoustic units comprise instructions for dividing the raw acoustic data into a plurality of graphemes, and wherein the instructions for determining the label for the sound signal based on the second mapping comprise:

instructions for determining a semantic property of the sound signal using the second mapping; and instructions for determining the label by selecting a candidate label from a plurality of candidate labels, the selected candidate label corresponding to the semantic property of the sound signal.

12. The non-transitory computer-readable medium of claim 11, wherein the sound signal additionally comprises noise other than the speech spoken by the user, wherein the instructions for determining the second mapping comprise mapping the noise to a known type of noise, and wherein the instructions further comprise:

instructions for determining an additional label for the sound signal, the additional label corresponding to a source of the known type of noise, wherein the noise is subtracted from the sound signal responsive to determining the additional label.

13. The non-transitory computer-readable medium of claim 10, wherein each candidate label of the plurality of candidate labels corresponds to a semantic property comprising one or more of language, age, gender, emotion, opinion, intent, and speech act.

14. The non-transitory computer-readable medium of claim 10, wherein the instructions for feeding the plurality of acoustic units through the first machine learning model to generate the first mapping comprise:

instructions for pre-training an acoustic model using a connectionist temporal classification, the acoustic model being a grapheme-based network, the first machine learning model using the acoustic model to generate the first mapping.

15. The non-transitory computer-readable medium of claim 14, wherein the instructions for pre-training the acoustic model comprise instructions for determining, using the connectionist temporal classification, an alignment of the raw acoustic data without use of an automated speech recognition model.

16. The non-transitory computer-readable medium of claim 10, the instructions further comprising instructions for jointly optimizing the first mapping and the second mapping by:

pre-training the first machine learning model;

determining that the pre-training of the first machine learning model is complete; and in response to determining that the pre-training of the first machine learning model is complete, updating the first mapping and the second mapping.

\* \* \* \* \*